United States Patent [19]
Harding et al.

[11] 3,825,380
[45] July 23, 1974

[54] MELT-BLOWING DIE FOR PRODUCING NONWOVEN MATS

[75] Inventors: John W. Harding; James P. Keller; Robert R. Buntin, all of Baytown, Tex.

[73] Assignee: Exxon Research and Engineering Company, Linden, N.J.

[22] Filed: July 7, 1972

[21] Appl. No.: 269,624

[52] U.S. Cl................ 425/72, 425/464, 264/176 F
[51] Int. Cl............................................. B29f 3/04
[58] Field of Search.............. 425/72, 83, 464; 65/9; 264/176 F

[56] References Cited
UNITED STATES PATENTS
2,252,689  8/1941  Bradshaw..................... 264/176 F X
3,379,811  4/1968  Hartmann et al................ 425/72 X
3,502,763  3/1970  Hartmann........................ 425/72 X FOREIGN PATENTS OR APPLICATIONS
462,642  1/1950  Canada................................ 425/72

*Primary Examiner*—R. Spencer Annear
*Attorney, Agent, or Firm*—David A. Roth

[57] ABSTRACT

A die having a special nose configuration approximating a triangle in cross section is especially suitable for use in a melt-blowing process for making very fine fibers from thermoplastic materials. A plurality of orifices are located in an edge-apex formed at the juncture of two sides of said triangle. The included angle encompassing said edge is within the range of 30° to 90°. The essential feature of said edge is that there are essentially no dead spaces where polymer can collect during the melt-blowing process. Any point on the edge which is more than about 0.002 inches (2 mils) from where the sides make initial contact with said edge is considered to be a dead space. Another feature of the invention involves air slot adjustment means in combination with said die nose.

9 Claims, 7 Drawing Figures

PATENTED JUL 23 1974        3,825,380
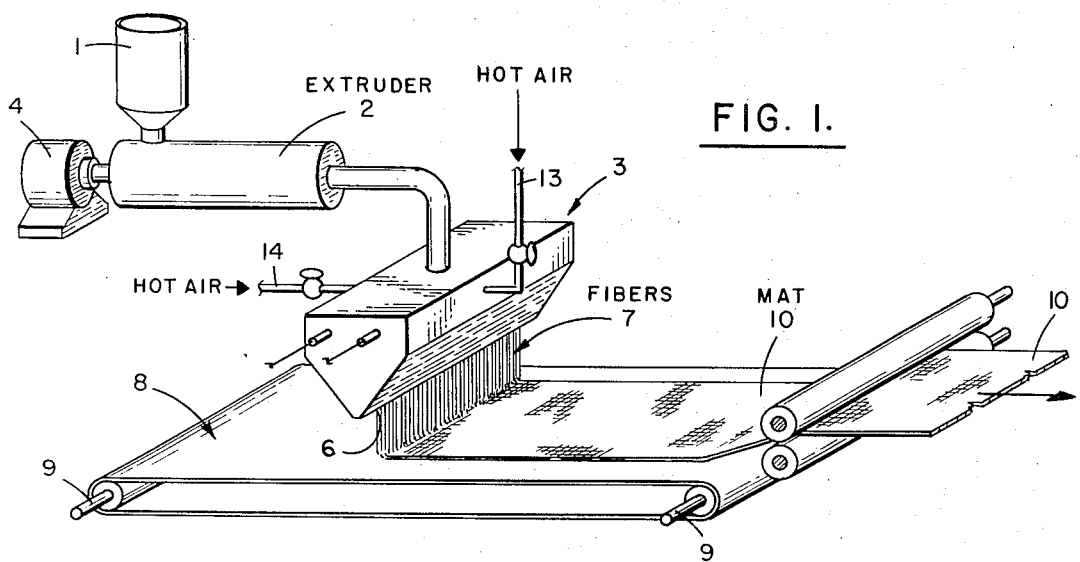
FIG. 1.
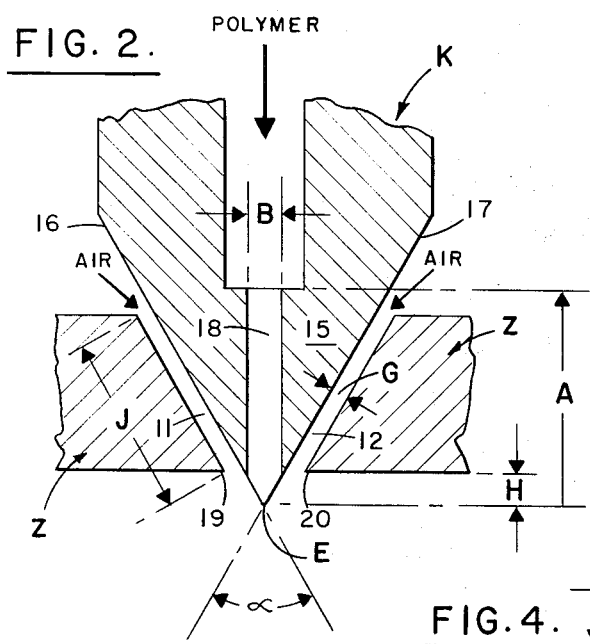
FIG. 2.
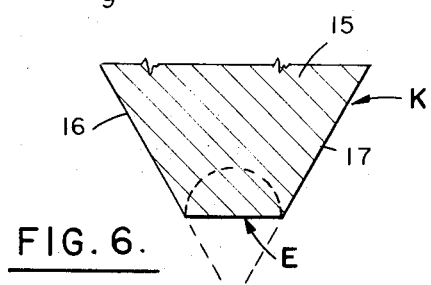
FIG. 6.
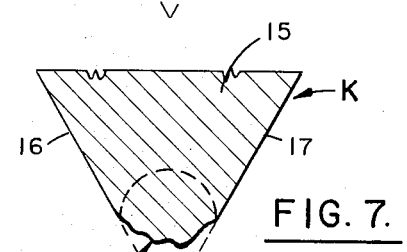
FIG. 7.
FIG. 4.
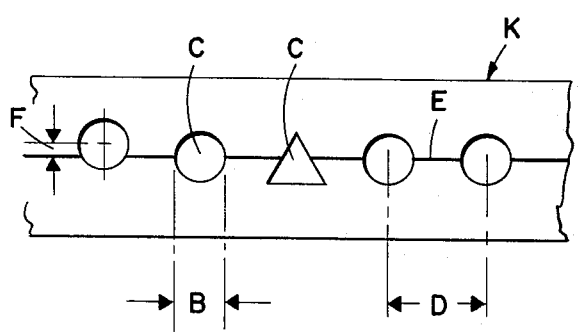
FIG. 5.
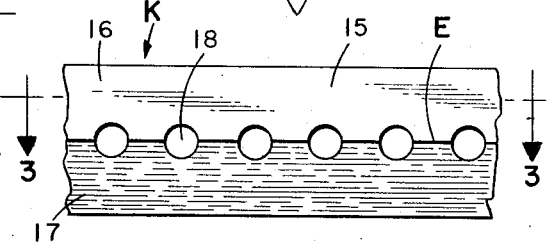
FIG. 3.

MELT-BLOWING DIE FOR PRODUCING NONWOVEN MATS

RELATED APPLICATIONS

There are no parent applications of this particular invention, but there are a series of commonly assigned copending and issued applications arising from the research work performed by Applicant's assignee. Among the most relevant of these are Ser. No. 242,504, which describes a different type of die design, and Ser. No. 227,769, which describes the preferred melt-blowing process. Ser. No. 227,769 is incorporated herein by reference in its entirety.

BACKGROUND OF THE INVENTION

Field of the Invention

The present invention is directed to a specific die-nose design for the melt-blowing of thermoplastic materials. More particularly, the present invention relates to a die-nose, preferably a solid, one-piece, sharp-edged die-nose, having incorporated therein particular design features for the melt-blowing of thermoplastic polymers.

2. Prior Art

Melt-blowing processes and die apparatus therefor are disclosed in the following publications:

1. Naval Research Laboratory Report 4364 "Manufacture of Superfine Organic Fibers," Apr. 15, 1954.
2. Wente, Van A., Industrial and Engineering Chemistry, 48, No. 8 (1956, pp 1342–1346).
3. Naval Research Laboratory Report "Formation of Superfine, Thermoplastic Fibers," Feb. 11, 1959.

A melt-spinning and blowing process is disclosed in British patent 1,055,187 and U.S. Pat. No. 3,379,811.

A jet spinning process is disclosed in Japanese patent 25871/69 published Oct. 30, 1969.

A melt-blowing apparatus is disclosed in U.S. Pat. No. 3,650,866.

SUMMARY OF THE INVENTION

A one-piece die apparatus having a novel sharp-edged die-nose component especially adapted for the melt-blowing of thermoplastic fiber-forming materials such as polymers to form nonwoven mats. The cross-sectional appearance of the die nose is approximately triangular in configuration. The edge-apex containing the die orifices is located at the juncture of two sides of the triangle and contains no point more than 2 mils from that juncture. Air adjustment means can also be included to work in combination with the die-nose.

BRIEF DESCRIPTION OF THE DRAWINGS

FIG. 1 is a schematic view of an integrated die apparatus for carrying out the melt-blowing process, including the specific one-piece die-nose of the invention as a subcomponent.

FIG. 2 is a detailed, expanded, cross-sectional view of the die-nose of FIG. 1 showing the die edge angle and the relationship of the die-nose to gas adjustment means.

FIG. 3 is a partial top view of the die-nose of FIG. 1.

FIG. 4 is a frontal view of the die-nose of FIG. 1.

FIG. 5 is a frontal view of another embodiment of the die-nose of FIG. 1 illustrating that the orifices need not be directly on line and need not be round.

FIG. 6 is an enlarged partial cross-sectional view of the "sharp" portion of the edge-apex, the dotted line representing a penumbra within which the edge can have any configuration.

FIG. 7 is an embodiment of FIG. 6 showing a rough edge configuration within the dotted line portion. Although this is not particularly preferred, it is within the scope of the invention.

DESCRIPTION OF THE PREFERRED EMBODIMENTS

Many thermoplastics can be made into quality nonwoven fibrous forms by the melt-blowing process providing a suitable die is used. The basic process consists of applying a hot gas (usually air) stream to two diametrically opposed sides of emerging molten polymer streams to cause elongation of the melt. The molten, elongated fiber streams are cooled ambiently and are collected preferably on a screen as a web. Details of the process are covered in Ser. No. 227,769.

It has been found that perturbations in the idealized process (shot formation caused by polymer accumulation and release as blobs, etc.) can be minimized by (1) utilizing dies with proper die nose sharpness, or (2) selection of proper air lip setback, or (3) utilizing both of the foregoing in combination. This invention describes the ranges of die geometry variables found to be useful in melt-blowing.

The Naval Research Laboratory dies were all two-piece split dies with grooves milled in their surfaces resulting in square or rectangular holes spaced from 50 per inch down to 9 per inch when assembled with grooves matched. In all cases, the die-nose had groupings of holes in an inch of die-nose interrupted with one inch intervals of solid nose material. These solid sections provided physical support and a space for bolts holding the two halves of the split nose together. The NRL workers concluded that nine holes per inch of die were desirable to reduce the amount of shot. Land lengths were one to two inches.

The Naval Research Laboratory work covered die-nose included angles of 30° to almost $\pi°$ with 60° recommended as the best compromise between making shot and rope. In this respect, the experiments of the present inventors are in agreement. Their air slits were 0.008 to 0.010 inches high with 9/16 inch land. There is no disclosure of any requirement for setback of the air slit edge from the die-nose, nor is there any recognition of the key factor of die edge sharpness.

When the problem of optimizing die-nose design was analyzed, it was found that there are at least ten parameters involved. It was discovered that only some of these such as hole size, die-nose sharpness, air slot height, and air lip setback must conform to critical specifications in order to obtain maximum quality at economical conditions. This is the underlying basis for several of the inventive features herein.

Referring to FIG. 1 of the drawings, one or more thermoplastic resin pellets are introduced into pellet hopper 1 of extruder 2. The thermoplastic blend is thermally treated in the extruder 2 and in some instances die head 3. The thermal treatment of the thermoplastic blend is carried out in the extruder 2 at fairly high temperatures depending on the particular thermoplastic, since the viscosity of the thermoplastic at the moment of contact with the hot air is important.

The degree of thermal treatment necessary varies depending upon the specific thermoplastic resin used as well as the molecular weight of the thermoplastic resin and the amount of thermal treatment which has been carried out on the thermoplastic resins prior to being introduced as pellets into the extruder 2.

It has been discovered, for example, that polypropylene and other polyolefins require substantial thermal treatment before they can be utilized in the melt-blowing process of the present invention. other usable thermoplastics are fully described in Ser. No. 227,769. Generally, they include all fiber-forming thermoplastics, including glass. Furthermore, there is no reason that thermosets that are capable of being melted cannot be used.

The thermoplastic blend is forced through the extruder 2 by a conveying screw operated by drive 4 and into die head 3. Die head 3 contains a heating unit which is actuated by electrical leads. This can be used for supplementary thermal treatment of thermoplastic resins before they are melt-blown.

The thermoplastic resin is then forced out a row of die openings 6 in the die head 3 into a gas stream which attentuated the resins into fibers 7 which are collected on a moving collection device 8 which in this embodiment is a belt which rotates on axles 9 to form a continuous nonwoven mat 10. Now refer to FIG. 2.

The gas stream which attenuates the thermoplastic resin blend is supplied through gas slots or channels 11 and 12. Gas slot means 11 and 12 which can be adjusted with gas adjustment means as described later herein and are supplied with a hot gas, preferably air, by gas transmission pipes 13 and 14. Details can be found in Ser. No. 227,769. For convenience, "air" will be used for discussion purposes herein, but it is to be understood that the term includes other gases and can be used interchangeably.

Although other factors can have some limited effect, the geometric configuration of the edge of die-nose is controlling. The edge (E) is formed at the juncture of the two exterior surfaces 16 and 17 of die-nose 15. In the preferred embodiment surfaces 16 and 17 define an isosceles triangle shown. Preferably, the apex (E) is as thin as possible, i.e., single line knife edge. But there are practical limitations in machining techniques and generally the die orifices will have a diameter exceeding the width of the edge and the edge will be flat.

Thus, it has been found that if the die-nose apex (E) is truncated to a flat having a width of no more than 0.002 inch, good quality nonwoven mats can be made. However, a die-nose apex (E) truncated to a flat having a width of 0.007 inch was not capable of making nonwoven mats with acceptably small shot under any melt-blowing condition.

While theoretically a sharp knife-like edge would give maximum performance, in practical actual use, it has been found that the flat version is more practical and performs almost as well.

One problem with a knife edge is that it is extremely susceptible to abrasion, bending, twisting, misalignments, distortions and the like at the slightest pressure or contact. This can cause die orifice blockage or misalignments.

Moreover, as seen later herein, in one embodiment the die-nose is used in combination with air slot adjustment means which must be set back a small but critical distance from the edge of the die-nose. For this reason, it is essential that the edge be uniform. Imparting a slight flat to the edge permits easy attainment of the very slight but important setback distances.

Similarly, die-nose apexes with "dead spaces" because of excessively large radii of curvature or other more complicated geometrics will not operate satisfactorily. p Any
on the die-nose apex (E) which is more than about 0.002 inch from the path of the high velocity gas streams is considered for the purpose of definition herein as "dead space."

It must be recognized that the actual gas stream path is of major impact here. The gas stream may or may not follow the surface of the die-nose apex depending on several factors. Thus a die-nose apex which is rounded but with too large a radius of curvature, i.e., more than ~0.002 inch, will be unsatisfactory since the gas stream will probably not follow the curvature of the surface. Further, in some instances, the gas stream may not follow the surface of the die-nose apex since the gas stream flow is determined by the configuration of the entire gas slot. These considerations must be taken into account when the die-nose is designed.

In the melt-blowing process of the present invention, the gas slot is defined by the configuration of the die-nose 15 of the die (K) and air slot adjustment means (Z).

In the melt-blowing process, the molten polymer streams, which can be a single thermoplastic polymer, a mixture of thermoplastic polymers, or thermoplastic polymers having dyes, additives, or other modifying agents therein, should be very rapidly drawn away from the die openings by the gas stream.

If there is a "dead space" on the apex (E) of the die-nose 15, then molten polymer will accumulate on the apex (E). Eventually the mass of molten polymer accumulates in the "dead space" until it reaches a relatively large size, and is then blown from the die-nose, not as a fiber, but as "shot." Thus, to avoid this objectionable "shot," the die-nose apex must be free of "dead space."

Within the context of this application "dead space" is a point on the die edge where polymer can "hide." That is, polymer will "hide" where the air stream cannot blow it off.

The significance of this invention resides in the discovery of the "dead space" phenomena and design modifications in the die-nose to avoid it.

Still referring to FIG. 2, it has been found in accordance with the present invention that the length of the land of die opening 18 shown as dimension (A) can vary over a range with essentially no effect on the operation of the die (K).

The minimum length (A) is mainly determined by the amount of metal available to serve as walls for the polymer melt once the overall air angles are selected. The maximum length of (A) is limited by the pressure required to extrude the polymer therethrough. Lengths (A) of 0.113 inches to 2 inches have been found suitable.

The diameter of die openings 18 is usually expressed in mean hydraulic diameter. The mean hydraulic diameter is equal to four times the wetted cross-sectional area divided by the wetted perimeter. (*Perry's Chemi-* cal Engineering Handbook, Fourth Edition, McGraw Hill, 1963, pp. 5–16).

The mean hydraulic diameter for a circle is the diameter and that for a square is the length of one side, as typical examples.

Die opening 18 preferably have a diameter (B) between 0.008 and 0.022 inches. Diameters within these ranges have been found satisfactory. Diameters (B) of 0.03 inch and larger could not be used without excessively large shot being formed in the nonwoven mat. Smaller diameters of (B) can be used. But the cost for holes of small diameter goes up sharply.

The die openings 18 may have any shape (C) since it is not critical to the operation of the melt-blowing process. Rectangular, triangular, and circular cross sections have been used with no apparent problems. The die openings in any particular die would usually have the same cross section for all openings, due to the ease in die fabrication; however, varying cross-sectional die openings 18 can be used.

Of significance to the economics of the melt-blowing process as well as to the uniformity of the nonwoven mat produced is the spacing (D) between die openings 18. Die openings 18 spaced so that there were 20 and 33 die openings per inch have been successfully run. In essence, observations have revealed that hole spacing has no significant effect as long as the die-nose is sharp.

It has been found and forms a feature of this invention that it is preferred to have as many die openings per inch as possible to maximize the uniformity of the nonwoven mat produced and efficiently use the blowing gas.

The orifices are spaced throughout the entire length of the die in a uniform manner, even when the die has a length of 40 inches or more. This is as opposed to the NRL work where die openings were formed in clusters with relatively large spaces between the cluster of openings.

In the preferred embodiment of the present invention, the die (K) is a solid one-piece structure and therefore the die openings are drilled into the die body. This can be accomplished by a variety of means such as conventional drilling techniques, electrical discharge machining (EDM), laser beams and the like. Dies with up to 40 inches of uninterrupted row of die openings have been made by EDM or drilling.

The single piece drilled dies have a distinct operational advantage over the split dies. In a split die, with the same included angle, the sharp edge is only one-half as thick and is easily deformed to the edge. This results in a slight bleeding of polymer between holes at the outlet edges. The resulting polymer bleed will then form either extremely fine fibers or shot, which results in a less uniform or an undesirable product.

A far lesser factor is the alignment of the die openings 18. Since the fabrication of a straight line of small die openings 18 is difficult, not all die openings 18 will be precisely centered on a single line or apex (E) of the die (K). Deviations shown as (F) in the die opening 18 centerline from the apex (E) of up to about 0.002 inch are acceptable according to the present invention.

A die with 2 percent of the die openings deviating greater than 0.003 inch but less than 0.004 inch is acceptable according to the present invention since such a die may be used over all operating conditions. However, a die with 5 percent or more of the die openings deviating more than 0.004 inch is unsatisfactory when operating at the high air regime (described in Ser. No. 227,679). A die opening which is more than 0.003 inch off the die-nose apex is easily seen with the naked eye.

Air slot adjustment means (Z) are shown in relation to die-nose 15 of the die (K) in FIG. 2. Air slots 11 and 12 are provided to deliver high velocity air uniformly to the emerging polymer strands from the die openings 18.

The depth (G) of the air slot and the setback (H) of the air slot lip edges 19 and 20 of adjustment means (Z) from edge (E) will also control the quality of the melt-blown product. The land length (J) of air slot adjustment means Z has been determined to be a minimal factor.

Air slot height (G) is adjusted to be small to use minimum air for the melt-blowing operation, but large enough to supply sufficient air to attentuate the molten polymer. Suitable heights for (G) range from about 0.006 inch to about 0.030 inch, preferably 0.008 to 0.015 inch.

The setback (H) of the edge of the air slot lip edges 19 and 20 from the point of the die-nose is critical in the high air mode. Since fiber breakage and restart is occurring continuously, the air lips should not be close enough to the polymer source to be spattered with polymer. When this occurs, the air pattern is distorted, fiber breakage and polymer accumulation on the lip is accelerated, and a poor, shot filled web is made.

When the setback is less than 0.005 inch with a sharp die tip, the maloperation described above occurs. When the setback is 0.015 or greater, the air can apparently expand and become turbulent closer to the die tip and more fiber breakage and shot occur even though the air lips are not wetted with polymer.

In the low air mode with a sharp die tip, the same dimensional limitations apply. However, when there is a flat on the die-nose, lesser or negative setbacks are operable.

The setback (H) has been found to be optimum when it is between 0.005 to 0.010, preferably 0.006 to 0.009 inch. In general, the length of the air land (J) is immaterial and is picked as a matter of convenience.

FIG. 4 illustrates a direct frontal view of a typical preferred die edge of die-nose 15 of the invention. The die holes are substantially circular, uniform and without substantial deviation from center. The die edge is the horizontal line on which the die orifices are approximately centered.

It will be noted that the diemeter of the die orifices exceeds the width of the die edge. This is shown more clearly in FIG. 3, which is a top view of the frontal segment of FIG. 4. The circular die orifices form semicircular cutouts in upper portion of the die edges. The flat should not exceed 4 mils.

Desirably, the die orifices would be smaller in diameter than the width of the die edge and still conform to the less than 2 mils rule set forth above.

The present day machining technology is not sufficiently advanced to achieve that desideratum. Directionally that is the route where further improvements should lie.

FIGS. 6 and 7 illustrate the different configurations that the die edge (E) can have and still conform to the principles of the invention. The dotted line represents the "edge envelope." The actual edge can have any configuration within that envelope so long as it follows the 2-mil rule. A preferable configuration for the edge is that it be relatively flat.

The die edge article component of the invention as well as the apparatus comprising a die and air adjustment slots is particularly useful in operations utilizing relatively high gas flows, herein called "high air mode." See Ser. No. 227,769 for details of the process.

The high air mode uses sonic velocities in the air slit. the product is an opaque soft mat of moderately oriented fibers with diameters from 0.5 to 5μ. This operation is best performed with a die-nose and air lip slot adjustment conforming to the criteria developed herein. Satisfactory products have been made with a die-nose with a 0.002 inch flat or sharper. However, a die-nose with a 0.007 inch flat did not yield satisfactory fine, fibered, high air product.

In the high air mode, frequent fiber breakage occurs at the die hole. Polymer continues to flow out of the hole and forms an accumulation until the blob is large enough to be carried away by the air stream. The larger the die-nose edge or flat at the die-nose the larger the blob of polymer that can form before the air forces are adequate to start a new fiber. The blobs then are transferred to the web as shot.

With a 0.041 inch edge or flat or greater, the polymer accumulation could grow and spread to adjacent holes and disrupt those fibers before the air could remove it. This usually leads to an inch or more of the die edge acting as a single large source of coarse irregular fibers and large shot.

The nature and object of the present invention having been completely described and illustrated, and the best mode thereof contemplated set forth, what we wish to claim as new and useful, and secure by Letters Patent is:

1. A melt-blowing die component article comrpising a die-nose having (1) a hollow interior, (2) exterior surfacees in a generally triangular cross-sectional configuration, and (3) a plurality of die orifices connecting said interior with the exterior, wherein said orifices are located at an apex-edge formed at the juncture of two exterior surfaces, and wherein no point on said apex-edge is more than 2 mils from said juncture.

2. An article according to claim 1 wherein said triangular cross-sectional configuration is essentially isosceles.

3. An article according to claim 1 wherein said die-nose is monolithic.

4. An article according to claim 1 wherein the included angle of said apex-edge is about 30° to 90°.

5. An article according to claim 1 which:
   a. is one single integral piece;
   b. has an included angle for the apex-edge of 55° to 65°; and
   c. has substantially circular or square cross-sectional area die openings having a mean hydraulic diameter less than 0.022 inch and which deviate no more than 0.003 inch from horizontal.

6. A die head apparatus comprising in combination;
   a. the die-nose of claim 1; and
   b. a pair of air slot adjustment means, having inner exterior surfaces approximately parallel to said exterior surfaces of said die-nose and lip edges, wherein said means is so constructed and arranged with respect to said die-nose as to provide:
      i. a setback of said lip edges from said edge-apex of from 0.005 to 0.010 inch and
      ii. an air slot height of about 0.006 to about 0.030 inch.

7. An apparatus according to claim 6 wherein said air slot height is from 0.008 to 0.015 inch.

8. An article according to claim 6 wherein said orifices are substantially circular or square cross-sectional areas having mean hydraulic diameters less than 0.022 inch and which deviate no more than 0.003 inch from horizontal.

9. An article according to claim 1 wherein said apex-edge is a flat no wider than 4 mils.

* * * * *